United States Patent [19]

Margaria

[11] Patent Number: 5,160,687
[45] Date of Patent: Nov. 3, 1992

[54] SCREW CAP OF THERMOPLASTICS MATERIAL

[75] Inventor: Mario Margaria, San Damiano D'Asti, Italy

[73] Assignee: Alplast SpA, Asti, Italy

[21] Appl. No.: 585,132

[22] PCT Filed: Mar. 28, 1989

[86] PCT No.: PCT/EP89/00340

§ 371 Date: Oct. 1, 1990

§ 102(e) Date: Oct. 1, 1990

[87] PCT Pub. No.: WO89/09169

PCT Pub. Date: Oct. 5, 1989

[30] Foreign Application Priority Data

Apr. 1, 1988 [IT] Italy .................. 67297 A/88

[51] Int. Cl.⁵ .................. B29B 13/00; B65D 41/00
[52] U.S. Cl. .................. 264/271.1; 264/275;
215/230; 215/316; 215/347; 215/DIG. 2
[58] Field of Search .................. 215/DIG. 2, 341, 347,
215/344, 252, 230, 233, 261, 316; 264/271.5,
275; 220/DIG. 14

[56] References Cited

U.S. PATENT DOCUMENTS

| 4,530,437 | 7/1985 | Gray et al. ............ | 215/252 |
| 4,756,437 | 7/1988 | Rossi-Mossuti ........ | 215/316 X |
| 4,872,573 | 10/1989 | Johnson et al. ........ | 215/347 |
| 4,948,665 | 8/1990 | Rosén ................. | 220/DIG. 14 |

FOREIGN PATENT DOCUMENTS 0239238 9/1987 European Pat. Off. .

Primary Examiner—Stephen Marcus
Assistant Examiner—Paul A. Schwarz
Attorney, Agent, or Firm—Sughrue, Mion, Zinn, Macpeak & Seas

[57] ABSTRACT

A screw cap of thermoplastic material, particularly intended for the closure of glass containers used in the food industry, is provided on the outer surface of its horizontal end wall (1) with a thin covering layer (13) of a composite laminated material which is adapted to form a barrier against the passage of gases through the wall. This composite, laminated material is constituted by a disc (13a) incorporated in the outer face of the horizontal end wall (1) of the cap during the injection moulding of the cap. The disc (13a) is permanently bonded to the horizontal end wall (1) of the cap and to a downwardly-curved wall (10) connecting the peripheral edge of the horizontal end wall (1) to a rounded annular shoulder (11) provided at the top of the cylindrical skirt (2) of the cap. The cap is made by a method in which the disc (13a) is inserted into the cavity of the matrix (19) of an injection mould (17, 18) and is held in place by frictional engagement of its peripheral edge with the ribs (23) of said matrix (19) which are intended to form vertical grooves (12) in the cylindrical skirt (2) of the cap.

1 Claim, 3 Drawing Sheets

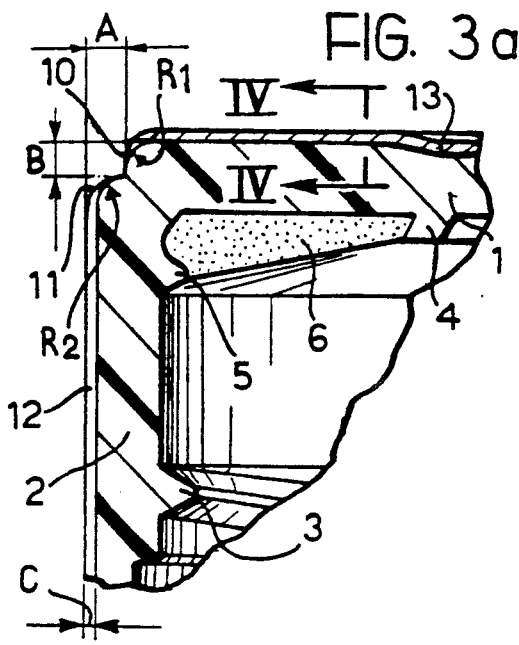
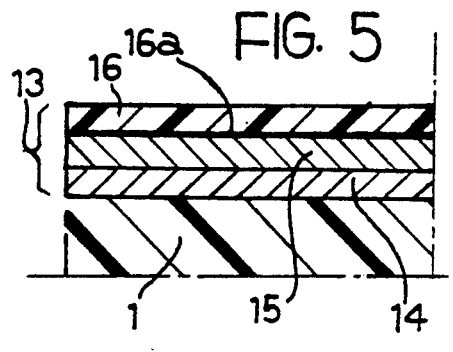
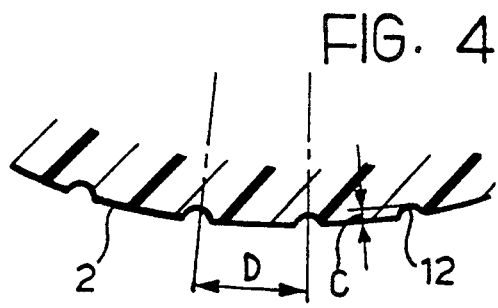
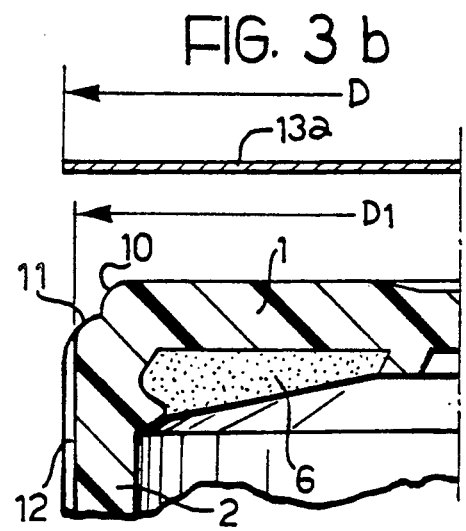
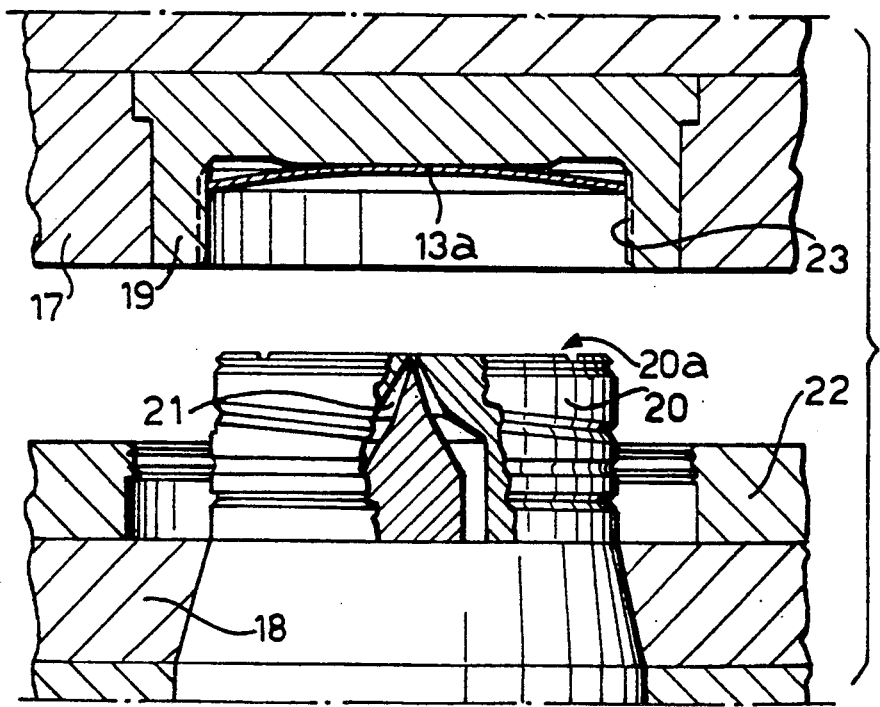

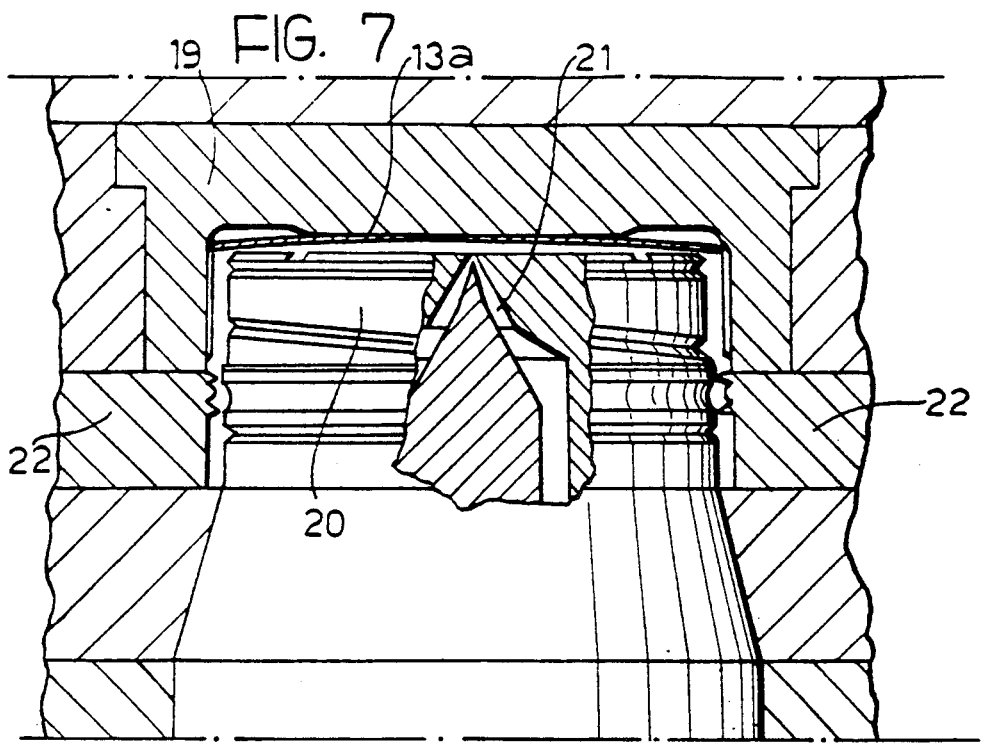
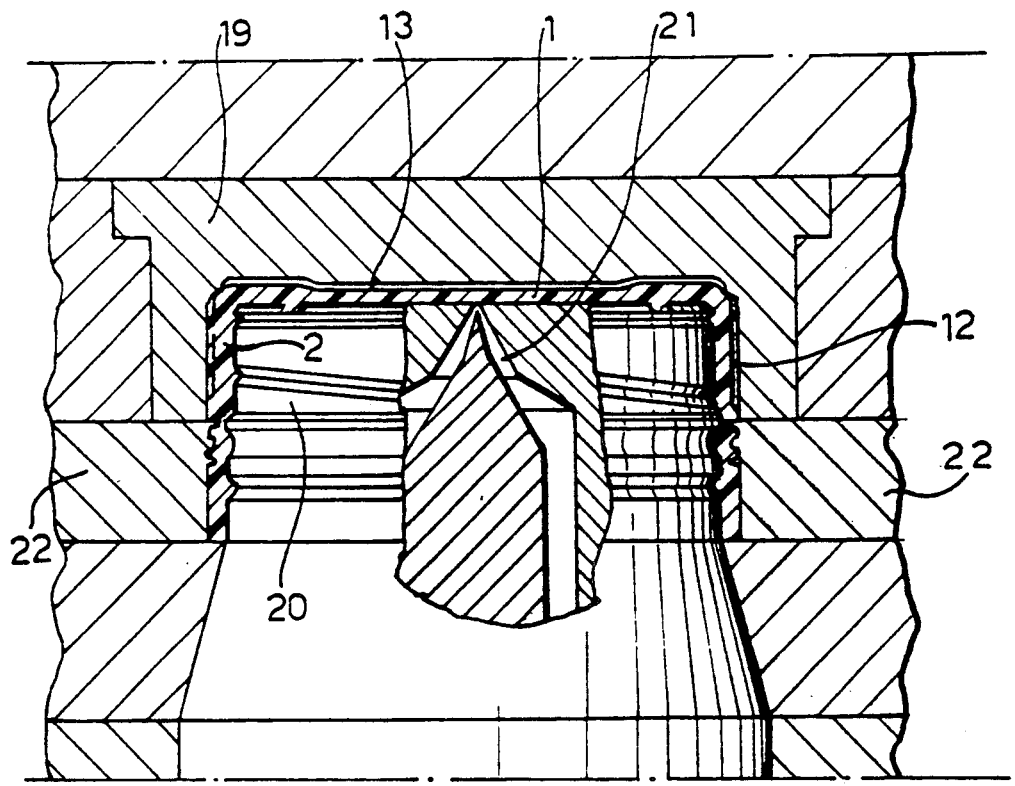

SCREW CAP OF THERMOPLASTICS MATERIAL

BACKGROUND OF THE INVENTION

The present invention relates to screw caps of thermoplastic material, particularly intended for the closure of glass containers used in the food industry, of the type comprising a horizontal end wall, a cylindrical skirt provided with internal threading for the screwing of the cap onto the externally-threaded mouth of a container, and sealing means carried by the internal surface of the horizontal end wall and adapted to cooperate with the mouth of a container to form a seal between the inside of the container and the cap when the cap is screwed onto the container, said cap being provided on the outer face of said horizontal end wall with a thin covering layer of a composite laminated material which is adapted to form a barrier against the passage of gases through said wall said thin covering layer being formed by a disc incorporated in the horizontal end wall of the cap during the injection moulding of the cap.

A screw cap of the above mentioned type is known from EP-A-0 239 238, which suggests that the disc forming the covering layer should extend over substantially the entire area of the outer surface of the horizontal end wall of the cap. The cap may be provided with a relatively impermeable sealing gasket to reduce the permeability of the cap.

The use of a disc having a diameter which is equal to (or smaller than) the diameter of the circular outer face of the horizontal end wall of the cap does not allow to obtain caps which are satisfactory from an aesthetic point of view, because in mass production a slight eccentricity between the disc and the circular horizontal end wall of the cap is practically unavoidable. Said eccentricity is particularly noticeable when the disc carries a printed decoration or information.

Moreover if a cured plastisol liner, which is relatively permeable, is used as sealing means, passage of gas may occur through the upper portion of the cylindrical skirt of the cap which is adjacent to the horizontal end wall of the cap.

A method for the manufacture by injection moulding of thermoplastic material into the cavity of a mould of a screw cap of the type mentioned in the first paragraph of the present specification is known from EP-A-0 239 238.

According to said method, prior to the injection, the disc is inserted into the cavity of the mould and is held in position therein, so that when the thermoplastic material is injected the disc becomes moulded into and permanently bonded to the outer surface of the horizontal end wall of the cap.

According to the teaching of said document the disc is held in position against the wall of the cavity corresponding to outer face of the horizontal end wall of the cap by providing a vacuum between the disc and the cavity. This is achieved by providing one or more vacuum ports, attached to a vacuum pump, in the region of the cavity where the disc is to be held.

Said vacuum ports are subject to be occluded by the thermoplastic material injected into the cavity of the mould if the material is injected in the absence of a disc or in the presence of a defective disc, which is subject to be bored under the pressure of the injected fused material.

Moreover the provision of vacuum passages in the mould and of vacuum pump connected to said passages increases the costs of the mould.

SUMMARY OF THE INVENTION

An object of the present invention is to provide a new and improved screw cap of thermoplastic material having a horizontal end wall, a cylindrical skirt provided with internal threading for screwing the cap onto an externally threaded mouth of a container and sealing means carried by an internal surface of the horizontal end wall adapted to cooperate with the mouth of the container to form a seal between the inside of the container and the cap, said cap being provided on the outer surface of said horizontal end wall with a thin covering layer of a composite laminated material which is adapted to form a barrier against the passage of gasses through said wall and said thin covering layer being formed by a disk incorporated in the horizontal end wall of the cap during the injection molding of the cap wherein the horizontal end wall of the cap has a circular peripheral edge with a diameter smaller than the diameter of the cylindrical skirt of the cap and is situated at a higher level than the top of the cylindrical skirt, said peripheral edge of the horizontal end wall being connected by means of a downwardly-curved wall to a rounded annular shoulder provided at the top of the cylindrical skirt of the cap with an outer surface of the cylindrical skirt of the cap being provided with spaced apart vertical grooves which extend from said shoulder to near the base of said skirt and wherein said covering layer extends over said horizontal end wall of the cap and said downwardly curved wall.

Another object of the present invention is to provide a new and improved method for manufacturing the foregoing screw cap by the injection of thermoplastic material into the cavity of the mold with the disk inserted into and held in position in the cavity of the mold so that when the thermoplastic material is injected, the disk becomes molded into and permanently bonded to the outer face of the horizontal end wall of the cap wherein the disk is positioned against the bottom wall of the mold cavity and is held in position by frictional engagement by the peripheral edge with the ribs of the matrix which are intended to form the grooves in the cylindrical skirt of the cap so that upon subsequent injection of fused thermoplastic material into the mold, it incorporates the disk in the horizontal end wall and in the downwardly curved wall at the peripheral edge of the horizontal end wall.

BRIEF DESCRIPTION OF THE DRAWINGS

Further characteristics and advantages of the present invention will become clear from the detailed description which follows with reference to the appended drawings, provided purely by way of non-limiting example, in which:

FIG. 3 is an enlarged view of the detail indicated by the arrow III in FIG. 2,

FIG. 3 bis is an exploded view of FIG. 3,

FIG. 4 is a cross-section taken on the line IV—IV of FIG. 3, on an enlarged scale, FIG. 5 is a partial cross-section taken on the line V—V of FIG. 1, on an enlarged scale, FIG. 6 is a partial section of a die for the manufacture by injection of the cap illustrated in FIGS. 1 to 5, the die being shown in the open position.

FIG. 7 is a view similar to FIG. 6, in which the die is shown in the closed position, and FIG. 8 is a view similar to that of FIG. 7 after the stage of injection of the plastics material.

DETAILED DESCRIPTION OF THE INVENTION

Figure 1:
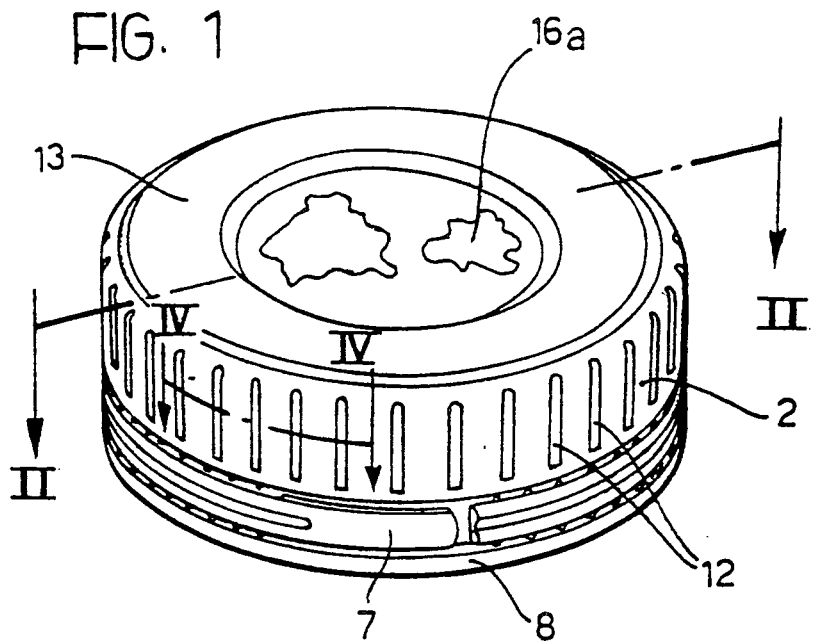
FIG. 1 is a perspective view of a screw cap according to the invention.
Figure 2:
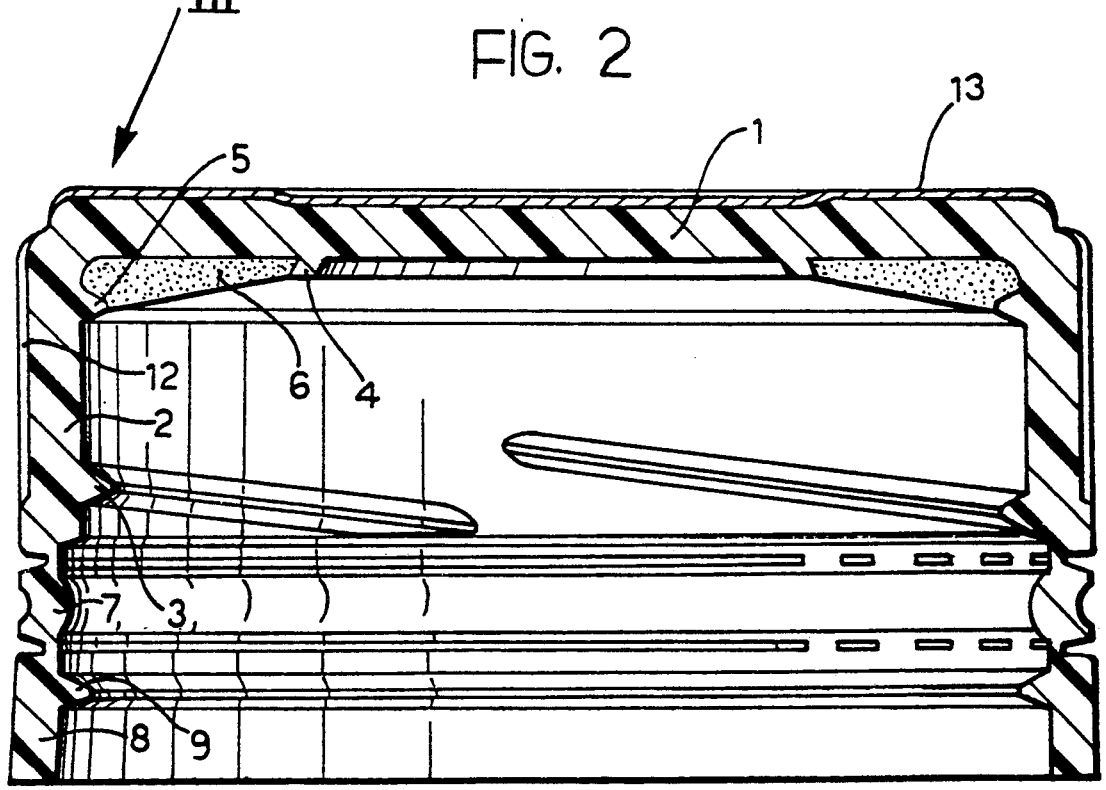
FIG. 2 is a section taken on the line II—II of FIG. 1, on an enlarged scale.

FIGS. 1 to 5 show a screw cap of high-rigidity thermoplastics material, such as polypropylene filled with mineral fibres, having a hardness greater than 75 Shore D and intended to be used for the closure of jars or bottles used in the food industry to contain solid products such as vegetables or meats, liquid products such as fruit juices, or pasty products such as sauces.

The cap shown is provided with a security seal adapted to indicate whether the cap has been tampered with, in accordance with the same Applicant's published European application No. EP-A-0261645; however, the present invention also extends to caps provided with other types of security seals, as well as to caps which are not provided with security seals.

The cap illustrated includes a horizontal end wall 1 and a cylindrical skirt 2 provided with internal threading 3 for the screwing of the cap on to the externally-threaded mouth of a container of the aforementioned type.

The cap has an annular rib 4 in its end region and a radial rib 5 at the top of the internal surface of the cylindrical skirt 2. The two ribs 4 and 5 form an annular seat for housing a sealing element 6 constituted by a plastisol which is cast and then polymerized by heat, and intended to form the seal between the cap and the edge of the mouth of the container.

The cap is provided with a tearable opening band 7 interposed between the cylindrical skirt 2 and a lower ring 8 provided with an internal annular rib 9 which is snap-engaged beneath a corresponding rib on the mouth of the container as a result of the first screwing-on of the cap, as described in detail in the European application cited above.

As shown in FIG. 3 in particular, the horizontal end wall 1 of the cap has a circular outline with a diameter smaller than the diameter of the cylindrical skirt 2 of the cap.

The difference between the radii of the horizontal end wall and the cylindrical skirt, indicated A in FIG. 3, is preferably between 1 and 1.2 mm.

The horizontal end wall 1 is also situated at a higher level than the top of the cylindrical skirt 2. This difference in level, indicated B in FIG. 3, is preferably of the order of 1 mm.

The peripheral edge of the horizontal end wall 1 is connected by means of a downwardly curved wall 10 to a rounded annular shoulder 11 provided at the top of the cylindrical skirt 2 of the cap.

The radius $R_1$ of the curved part 10 is between 1.2 and 1.8 mm, preferably 1.5 mm, whilst the radius $R_2$ of the rounded shoulder 11 is preferably 0.75 mm.

The cylindrical skirt 2 of the cap is provided on its outer surface with spaced-apart vertical grooves 12 which extend from the shoulder 11 to near the base of the cylindrical part 2. The grooves 12 have a depth equal to approximately half the thickness of the shoulder 11.

The grooves 12 are preferably semicircular grooves having a radius of 0.5 mm and the angular spacing of these grooves, indicated D in FIG. 4, is of the order of 10°.

A thin covering layer permanently bonded to the outer surface of the horizontal end wall 1 of the cap is indicated 13. The covering layer 13 is made from a material which is adapted to form a barrier against the passage of gases through the wall.

As shown in FIG. 3 in particular, the covering layer 13 extends over the horizontal part of the wall 1 and over the downwardly-curved connecting wall 10.

As shown in FIG. 5, the covering layer 13 is constituted by a composite, laminated material including an inner layer 14 of thermoplastics material of the same type as that used for the manufacture of the cap, that is, polypropylene, but with a melting point which is 30°-50° C. lower than that of said material, an intermediate layer 15 which forms the gas barrier, and an outer layer 16 of plastics material.

The intermediate layer 15 preferably constituted by a film of aluminum having a thickness of between 0.008 and 0.014 mm. Alternatively, the intermediate layer 15 may be constituted by a film of plastics material adapted to fulfil the function of a barrier against the passage of gases, for example polyvinylidene chloride or polyvinyl alcohol.

The plastics material used for the external layer 16 may be constituted, for example, by polyester or polypropylene. Polyester is considered to be better since it contributes to the formation of a barrier to the passage of gases and has good antistatic properties.

The layer 16 is of transparent material and on its inner surface carries writing or designs 16a applied by printing, for example, by rotogravure or by flexographic printing.

The overall thickness of the covering layer 13 is normally between 0.130 and 0.400 mm.

The cap is produced by injection moulding and the thin covering layer 13 is formed by a disc 13a incorporated in the horizontal end wall 1 and in the cap during the injection moulding of the cap itself.

As shown in FIG. 3 bis, the diameter D of the disc 13a is slightly greater than the diameter $D_1$ of an imaginary cylindrical surface which is tangent to the bottom of the grooves 12.

Preferably the difference between the diameters D and $D_1$ is 0.2 mm.

The aforementioned manufacturing method is illustrated in detail FIGS. 6, 7 and 8. In FIG. 6, a die constituted by two parts 17, 18 is shown in the open position.

The part 17 of the mould carries a matrix 19 whilst the part 18 carries a core 20 provided with a duct 21 for supplying the fused thermoplastics material to the mould, and a pair of jaws 22 which are movable radially relative to the part 18.

The matrix 19 is provided with internal ribs 23 for forming the grooves 12 of the cylindrical skirt of the cap.

As shown in FIG. 6 in the open position of the mould the disc 13a is positioned against the bottom wall of the cavity of the matrix 19 so that its peripheral edge is brought into frictional engagement with the ribs 23 due to the fact that the diameter of the disc 13 is greater than the diameter of the cylindrical surface touching the crests of the ribs 23. The disc 13a is therefore held in place in the mould in a very simple and effective manner.

In the next stage of closure of the die, the end surface 20a of the core 20 is moved close to the disc 13a as shown in FIG. 7.

During the subsequent stage of the injection of the thermoplastics material through the duct 21 of the core 20, the disc 13a is moulded into and permanently bonded to the horizontal end wall 1 and the downwardly curved wall 10 of the cap to form the covering layer 13.

The fact that the covering layer 13, which forms a barrier against the passage of gas, extends also over the downwardly curved wall 10 increases the protection against the passage of gas through the cap, particularly when the cap is provided with gas permeable sealing means such as a cured plastisol liner.

Moreover the aesthetic appearance of the cap is not impaired in the case of a slight eccentricity between the disc and the circular horizontal end wall of the cap.

What is claimed is:

1. A method for the manufacture of a screw cap of thermoplastic material having a horizontal end wall, including a downwardly-curved wall defining a peripheral edge of said horizontal end wall, a cylindrical skirt with internal threads and spaced apart external vertical grooves and a thin covering layer of a composite laminated material on an outer surface of the horizontal end wall to form a barrier against the passage of gases through the wall using a mold comprised of a matrix and a core which are capable of relative movement between an open and closed position, the method comprising:

positioning a disk which will form said thin covering layer in said matrix with the outer periphery of the disk fictionally engaged with projections on said matrix adapted to form the grooves in said skirt;

closing the mold to bring an end surface of the core into close proximity to said disk; and injecting thermoplastic material through said core into a space between the core and the matrix so as to form the cap and simultaneously incorporate the disk in the horizontal end wall while simultaneously pressing the peripheral edge portion of the disk into an annular groove in the matrix whereby the outer peripheral edge of the disk will overlie the horizontal end wall of the cap and the downwardly-curved wall defining the peripheral edge of the horizontal end wall.

* * * * *